F. V. GILBERT.
FAUCET.
APPLICATION FILED FEB. 25, 1921.
1,436,650.
Patented Nov. 28, 1922.
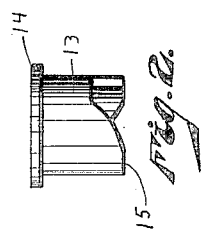
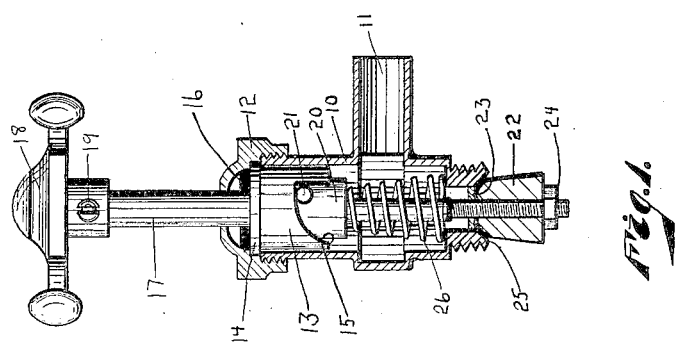

Patented Nov. 28, 1922.

1,436,650

UNITED STATES PATENT OFFICE.

FRANK V. GILBERT, OF CHICAGO, ILLINOIS, ASSIGNOR OF ONE-THIRD TO WILLIAM J. GOURLEY AND ONE-THIRD TO PETER K. CLAYTON, JR., BOTH OF CHICAGO, ILLINOIS.

FAUCET.

Application filed February 25, 1921. Serial No. 447,765.

*To all whom it may concern:*

Be it known that I, FRANK V. GILBERT, a citizen of the United States, and a resident of the city of Chicago, county of Cook, and State of Illinois, have invented certain new and useful Improvements in Faucets, of which the following is a specification.

My invention relates to improvements in faucets, and the object of the invention is to provide a faucet with a valve which will close automatically with the flow of water through said valve, and will be held closed by the pressure of the water beneath said valve.

Another object is to provide a construction of this character which is simple, inexpensive and durable, and which may be readily installed.

Other objects will appear hereinafter.

The invention consists in the combinations and arrangements of parts hereinafter described and claimed.

The invention will be best understood by reference to the accompanying drawings forming a part of this specification, and in which, Fig. 1 is a vertical sectional view of the invention; and Fig. 2 is a side view of the sleeve.

The form of construction illustrated comprises a casing 10 having an outlet or spout 11 near its middle portion, and a cap 12 threaded to its upper end. A sleeve 13 is provided with a circular flange 14 which is clamped in position between the cap 12 and the upper end of the casing 10, whereby the sleeve is rigidly held in position. Cams 15, having flattened portions, are provided at the lower end of said sleeve, and a packing 16 is placed between the upper end of the sleeve and the cap 12.

A valve stem 17 is mounted in the casing, for rotary and vertical movement through the cap and sleeve, and has manual operating means fastened at its upper end, as at 19, and an enlargement 20 at its middle portion, upon which lugs 21 are provided which co-operate with the cams 15. A ball valve 22 is adjustably mounted on the lower end of the stem by means of a nut 23 above the ball valve and a nut 24 beneath the same. A valve seat 25 is provided at the end of the casing, which co-operates with the ball valve, and a spring 26 is mounted on the stem and seated between the enlargement 20 and the bottom of the casing.

The particular feature of my invention is that the valve will always close with the flow or pressure of the fluid passing through said valve, and that the spring acts in conjunction with the pressure of the fluid to close said valve and keep it firmly closed. By using the form of sleeve shown, the valve may be locked open by rotating the stem until the lugs 21 seat upon the flat ends of the cams 15.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent, is:

1. A faucet comprising a casing having a valve seat adjacent one end; a sleeve mounted in said casing; a solid stem mounted in said sleeve; a ball valve on said stem adapted to engage said valve seat; cam means on said sleeve and stem to open said valve by rotation of said stem and to lock said valve in open position; an outlet adjacent said cam means; a spring on said stem between said cam means and said valve seat to automatically close said valve on rotation of said stem in one direction.

2. A faucet comprising a casing provided with a valve seat and a spout; a cam-sleeve mounted in said casing and provided with a flange; a cap to engage said flange and clamp said sleeve on said casing; a stem provided with an enlarged portion to fit snugly in said sleeve; a ball valve on the inner end of said stem to engage the valve seat; lugs on said enlarged portion to engage the cam on said sleeve for opening said valve; portions on said cam to engage said lugs and lock the valve open; and a spring to normally hold said valve closed.

In testimony whereof I have signed my name to this specification in the presence of two subscribing witnesses.

FRANK V. GILBERT.

Witnesses:
JOSHUA R. H. POTTS,
FREDA C. APPLETON.